(12) United States Patent
Shekel

(10) Patent No.: US 6,917,725 B2
(45) Date of Patent: Jul. 12, 2005

(54) MODULATED LIGHT SOURCE

(75) Inventor: Eyal Shekel, Beit Zayit (IL)

(73) Assignee: Chiaro Networks Ltd., Jerusalem (IL)

( * ) Notice: Subject to any disclaimer, the term of this patent is extended or adjusted under 35 U.S.C. 154(b) by 0 days.

(21) Appl. No.: 10/409,626

(22) Filed: Apr. 8, 2003

(65) Prior Publication Data
US 2004/0017963 A1 Jan. 29, 2004

Related U.S. Application Data (62) Division of application No. 09/943,375, filed on Aug. 29, 2001, now Pat. No. 6,574,382, which is a division of application No. 09/312,781, filed on May 17, 1999, now Pat. No. 6,304,695.

(51) Int. Cl.[7] .............. G02F 1/025; G02B 6/12; G02B 6/122; G02B 6/125; G02B 6/30
(52) U.S. Cl. .............. 385/3; 385/14; 385/49; 438/27; 438/31
(58) Field of Search .............. 385/14, 49, 92, 385/93, 94

(56) References Cited

U.S. PATENT DOCUMENTS

| | | | | |
|---|---|---|---|---|
| 4,750,799 A | * | 6/1988 | Kawachi et al. | 385/14 |
| 4,752,109 A | | 6/1988 | Gordon et al. | |
| 4,867,517 A | * | 9/1989 | Rawson | 385/37 |
| 4,892,374 A | * | 1/1990 | Ackerman et al. | 385/49 |
| 5,082,342 A | | 1/1992 | Wight et al. | |
| 5,177,348 A | | 1/1993 | Laor | |
| 5,195,154 A | | 3/1993 | Uchida | 385/88 |
| 5,210,800 A | | 5/1993 | Asai et al. | 385/12 |
| 5,261,156 A | | 11/1993 | Mase et al. | |
| 5,293,441 A | * | 3/1994 | Tanisawa | 385/92 |
| 5,347,601 A | * | 9/1994 | Ade et al. | 385/3 |
| 5,358,896 A | * | 10/1994 | Komatsu et al. | 438/31 |
| 5,375,182 A | | 12/1994 | Chambers et al. | |
| 5,377,286 A | | 12/1994 | Iida et al. | |
| 5,388,172 A | | 2/1995 | Anderson | 385/23 |
| 5,394,498 A | | 2/1995 | Hinterlong et al. | |
| 5,446,815 A | | 8/1995 | Ota et al. | |
| 5,458,538 A | | 10/1995 | MacLeod et al. | 385/92 |
| 5,475,415 A | * | 12/1995 | Noethen | 347/241 |
| 5,479,539 A | | 12/1995 | Goldsmith et al. | |

(Continued)

FOREIGN PATENT DOCUMENTS

| | | |
|---|---|---|
| EP | 0 516 064 A2 | 12/1992 |
| EP | 0 706 225 A1 | 4/1996 |
| EP | 0 859 262 A2 | 8/1998 |
| JP | 03-163401 A * 7/1991 | 385/49 |
| WO | WO 98/57230 A1 * 12/1998 | |
| WO | WO 98/59276 A1 * 12/1998 | |

OTHER PUBLICATIONS

LC1000 Series GaAs Optical Modulatorsfor D.C. to 50 Ghz, GEC–Marconi, Materials Technology, Caswell Towcester, Northamptonshire, U.K. (no date).

2.5 Ghz, 8 & 18GHz Integrated Optical Amplitude Modulators GEC Advanced Optical Products, West Hanningfeld Road; Great Baddow, Chelmsford, Essex, U.K. 1995.

Novel 1 x N and N x N Integrated Optical Switches Using Self–Imaging Multimode GaAs/AlGaAs Waveguides by R.M. Jenkins et al., Applied Physics Letters, vol. 64(6), Feb. 7, 1994, pp. 684–686.

(Continued)

Primary Examiner—John Juba, Jr.
(74) Attorney, Agent, or Firm—Darby & Darby (57) ABSTRACT

A method of producing a modulated light source including the steps of providing a modulator, fiberlessly coupling a laser diode light source to the modulator and enclosing the modulator and the laser diode light source within a housing together with output optics operative to direct modulated light from the modulator into an optical fiber extending outwardly from the housing.

6 Claims, 9 Drawing Sheets

U.S. PATENT DOCUMENTS

| | | | | |
|---|---|---|---|---|
| 5,481,629 A | * | 1/1996 | Tabuchi | 385/14 |
| 5,482,585 A | | 1/1996 | Ota et al. | 156/158 |
| 5,487,124 A | | 1/1996 | Bowen et al. | 385/93 |
| 5,559,915 A | | 9/1996 | Deveau | 385/49 |
| 5,570,442 A | | 10/1996 | Arii et al. | 385/46 |
| 5,579,424 A | | 11/1996 | Schneider | 385/49 |
| 5,600,741 A | | 2/1997 | Hauer et al. | 385/35 |
| 5,600,745 A | | 2/1997 | Wuu et al. | 385/49 |
| 5,611,014 A | | 3/1997 | Basavanhally | 386/90 |
| 5,625,726 A | | 4/1997 | Ichigi | 385/14 |
| 5,631,986 A | | 5/1997 | Frey et al. | |
| 5,655,041 A | * | 8/1997 | Forrest et al. | 385/49 |
| 5,656,120 A | | 8/1997 | Ota et al. | 156/293 |
| 5,677,973 A | | 10/1997 | Yuhara et al. | |
| 5,703,973 A | | 12/1997 | Mettler et al. | 385/14 |
| 5,703,980 A | | 12/1997 | MacElwee et al. | 385/49 |
| 5,706,378 A | | 1/1998 | Suzuki et al. | 385/49 |
| 5,708,741 A | | 1/1998 | DeVeau | 385/49 |
| 5,712,937 A | | 1/1998 | Asawa et al. | 385/49 |
| 5,712,940 A | | 1/1998 | Van Roemburg et al. | 385/93 |
| 5,721,797 A | | 2/1998 | Basavanhally et al. | 385/49 |
| 5,732,173 A | | 3/1998 | Bylander et al. | 385/49 |
| 5,732,181 A | | 3/1998 | Engberg et al. | 385/139 |
| 5,737,138 A | | 4/1998 | Someno | 359/900 |
| 5,745,265 A | | 4/1998 | Hasegawa et al. | 359/15 |
| 5,761,178 A | | 6/1998 | Fukakusa et al. | 369/112 |
| 5,784,509 A | | 7/1998 | Yamane et al. | 385/49 |
| 5,793,914 A | | 8/1998 | Sasaki | 385/49 |
| 5,799,119 A | | 8/1998 | Rolland et al. | 385/28 |
| 5,802,222 A | | 9/1998 | Rasch et al. | |
| 5,825,951 A | * | 10/1998 | Kitamura | 385/45 |
| 5,828,800 A | | 10/1998 | Henry et al. | 385/20 |
| 5,835,646 A | | 11/1998 | Yoshimura et al. | |
| 5,835,659 A | | 11/1998 | Ota et al. | 385/137 |
| 5,852,700 A | | 12/1998 | Caponi et al. | |
| 5,854,867 A | | 12/1998 | Lee et al. | 385/49 |
| 5,854,868 A | | 12/1998 | Yoshimura et al. | 385/50 |
| 5,859,945 A | | 1/1999 | Kato et al. | 385/89 |
| 5,867,619 A | | 2/1999 | Jarek et al. | 386/52 |
| 5,872,880 A | | 2/1999 | Maynard | |
| 5,875,274 A | | 2/1999 | Stein | 385/49 |
| 5,881,190 A | | 3/1999 | Harpin et al. | 385/49 |
| 5,892,857 A | | 4/1999 | McCallion | 385/1 |
| 5,898,806 A | * | 4/1999 | Nishimoto | 385/49 |
| 5,907,649 A | | 5/1999 | Acklin et al. | 385/49 |
| 5,926,594 A | | 7/1999 | Song | |
| 5,963,357 A | * | 10/1999 | Kubota et al. | 359/239 |
| 5,986,451 A | | 11/1999 | Kagan | 324/210 |
| 6,074,104 A | | 6/2000 | Higashikawa | |
| 6,081,499 A | | 6/2000 | Berger et al. | 369/112 |
| 6,093,939 A | * | 7/2000 | Artigue et al. | 385/94 |
| 6,157,012 A | | 12/2000 | Tanaka et al. | |
| 6,175,675 B1 | | 1/2001 | Lee et al. | |
| 6,222,967 B1 | * | 4/2001 | Amano et al. | 385/49 |
| 6,226,424 B1 | | 5/2001 | Ball et al. | 385/14 |
| 6,366,720 B1 | | 4/2002 | Shekel et al. | 385/33 |
| 6,370,302 B2 | | 4/2002 | Shekel et al. | 385/52 |
| 6,442,451 B1 | | 8/2002 | Lapham | |
| 6,480,651 B1 | | 11/2002 | Rabinski | |
| 6,556,285 B1 | | 4/2003 | Dickson | |
| 6,587,611 B1 | | 7/2003 | Hunt | |
| 6,589,376 B1 | | 7/2003 | Davis et al. | |
| 6,590,658 B2 | | 7/2003 | Case et al. | |
| 6,611,635 B1 | * | 8/2003 | Yoshimura et al. | 385/14 |
| 6,654,523 B1 | | 11/2003 | Cole | |
| 6,654,524 B2 | | 11/2003 | Shekel | |
| 2001/0055460 A1 | | 12/2001 | Steinberg | |
| 2003/0053054 A1 | | 3/2003 | Li et al. | |
| 2003/0063277 A1 | | 4/2003 | Kennedy et al. | |

OTHER PUBLICATIONS

"High Speed Electrooptic Modulation in GaAs/GaS/iAs Waveguide Devices", Robert G. Walker, Journal of Lightwave Technology, vol. LT–5, No. 10, pp. 1444–1453, Oct. 1987.

"Broadband Y–Branch Electro–Optic GaAs Waveguide Interferometer for 1.3 Micrometers", by P. Buchmann et al., Applied Physics Letters, vol. 46, No. 5, pp. 462–464 (1985).

Broad–Band Guided–Wave Electrooptic Modulators, by Richard A. Becker, The Journal of Quantum Electronics, vol. QE–20, No. 7, Jul. 1984, pp. 723–727.

* cited by examiner

MODULATED LIGHT SOURCE

This is a divisional of application Ser. No. 09/943,375, filed Aug. 29, 2001, now U.S. Pat. No. 6,574,382, which is a divisional of application Ser. No. 09/312,781, filed May 17, 1999 now U.S. Pat. No. 6,304,695. Each of these prior applications is hereby incorporated herein by reference, in its entirety.

FIELD OF THE INVENTION

The present invention relates to light modulators generally.

BACKGROUND OF THE INVENTION

Various types of light modulators are known. These include, for example, Mach-Zehnder type modulators and electroabsorption modulators. The following literature references describe various Mach-Zehnder type modulators;

High-Speed Electrooptic Modulation in GaAs/GaAlAs Waveguide Devices, by Robert G. Walker, Journal of Lightwave Technology, Vol LT-5, No. 10, pp 1444–1453, October, 1987 and the references therein;

Broadband Y-branch electro-optic GaAs waveguide interferometer for 1.3 micrometers, by P. Buchmann et al, Applied Physics Letters, Vol 46, No. 5, pp 462–464 (1985);

Broad-Band Guided-Wave Electrooptic Modulators, by Richard A. Becker, The Journal of Quantum Electronics, Vol. QE-20, No. 7, July, 1984, pp 723–727;

The following product publications describe what is believed to be the state Mach-Zehnder optical modulators:

LC1000 Series GaAs Optical Modulators for D.C. to 50 GHz, GEC-Marconi, Materials Technology, Caswell Towcester, Northamptonshire, U.K.

2.5 GHz, 8 & 18 GHz Integrated Optical Amplitude Modulators, GEC Advanced Optical Products, West Hanningfield Road, Great Baddow, Chelmsford, Essex, U.K.

The following reference shows an optical switch which employs a multimode interference coupler:

Novel 1×N and N×N integrated optical switches using self-imaging multimode GaAs/AlGaAs waveguides by R. M. Jenkins et al., Applied Physics Letters, Vol 64 (6), 7 Feb. 1994, pp. 684–686.

SUMMARY OF THE INVENTION

The present invention seeks to provide an improved and exceedingly cost effective optical coupler.

There is thus provided in accordance with a preferred embodiment of the present invention a modulated light source module including a modulator disposed in a housing, a laser diode light source disposed in the housing and fiberlessly coupled to the modulator, and output optics operative to direct modulated light from the modulator into an optical fiber extending outwardly from the housing.

Further in accordance with a preferred embodiment of the present invention the modulator includes an input multi-mode interference coupler; an output multi-mode interference coupler, and first and second waveguides interconnecting the input multi-mode interference coupler and the output multi-mode interference coupler, the first and second waveguides having associated therewith electrodes for the application of voltage thereacross, thereby to vary the phase of light passing therealong.

Still further in accordance with a preferred embodiment of the present invention the modulator includes an input Y-junction splitter, an output Y-junction combiner, and first and second waveguides interconnecting the Y-junction splitter and the output Y-junction combiner, the first and second waveguides having associated therewith electrodes for the application of voltage thereacross, thereby to vary the phase of light passing therealong.

Additionally in accordance with a preferred embodiment of the present invention the laser diode light source is monolithically integrated with the modulator.

Preferably the laser diode light source is monolithically integrated with the modulator and occupy different regions of at least some of identical epitaxial layers.

Additionally or alternatively in accordance with a preferred embodiment of the present invention the laser diode light source is a discrete element which is mechanically mounted in a desired position with respect to said modulator.

Still further in accordance with a preferred embodiment of the present invention the laser diode light source is butted against an input to the modulator.

Alternatively the laser diode light source is coupled to an input to the modulator via a discrete lens.

Additionally in accordance with a preferred embodiment of the present invention the each of the laser diode light source and the modulator are mounted on parallel surface mountings, the parallel surface mountings include mutually facing surfaces which lie in parallel planes which are perpendicular to an optical axis of a light beam propagating from the laser diode light source towards the modulator via the lens.

Preferably the laser diode light source and the modulator are aligned by relative movement thereof in the parallel planes and are fixed in desired alignment by fixing the mutually facing surfaces together.

Further in accordance with a preferred embodiment of the present invention at least one of the laser diode light source and the modulator are mounted onto a support element by means of side mounting blocks which are fixed in position upon precise mutual alignment of the laser diode light source and the modulator.

Preferably the modulator is implemented in gallium arsenide.

There is also provided in accordance with a preferred embodiment of the present invention a method of producing a modulated light source including the steps of providing lator, fiberlessly coupling a laser diode light source to the modulator, and enclosing the modulator and the laser diode light source within a housing together with output optics operative to direct modulated light from the modulator into an optical fiber extending outwardly from the housing.

Further in accordance with a preferred embodiment of the present invention the step of fiberlessly coupling a laser diode light source to the modulator includes the steps of using at least one external manipulator, manipulating at least one of the modulator and the laser diode light source relative to the other such that the output beam of the laser diode enters the modulator with relatively low light loss, and fixing the modulator and the laser diode light source in desired relative positions independently of the external manipulator, and disengaging the at least one external manipulator from the modulated light source.

Still further in accordance with a preferred embodiment of the present invention the step of fixing the modulator and the laser diode light source in desired relative positions comprises fixedly attaching parallel surfaces attached to the modulator and to the laser diode light source to each other in desired relative orientations.

Preferably the step of fixing the modulator and the laser diode light source in desired relative positions includes employing side mounting blocks to fix at least one of the laser diode light source and the modulator in position upon precise mutual alignment of the laser diode light source and the modulator.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
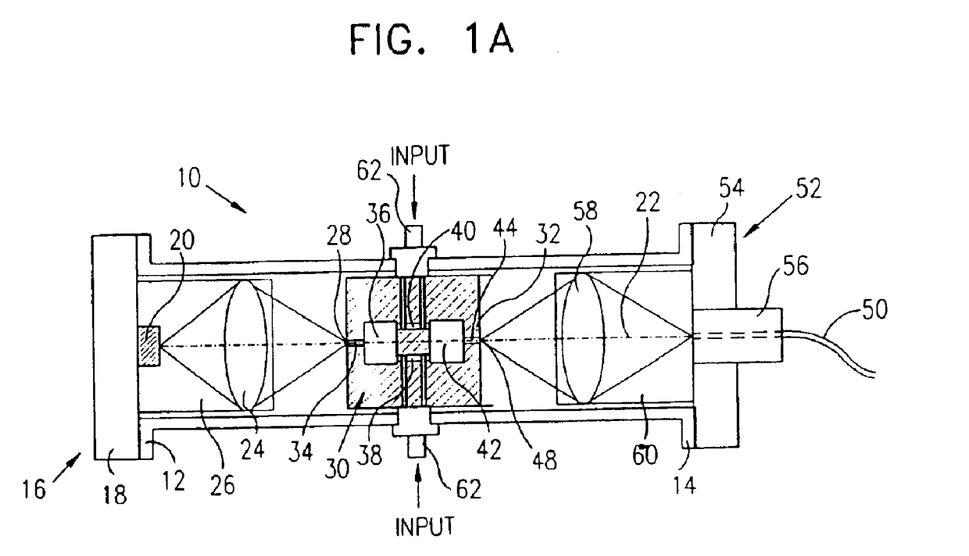
FIG. 1A is a simplified sectional illustration of a modulated light source module constructed and operative in accordance with a preferred embodiment of the present invention.

Reference is now made to FIG. 1A, which is a simplified sectional illustration of a modulated light source module constructed and operative in accordance with a preferred embodiment of the present invention.

The modulated light source of FIG. 1A preferably comprises a generally cylindrical housing 10, typically having a rectangular cross section and preferably having mounting surfaces, such as end flanges 12 and 14 at respective opposite ends thereof. Housing 10 is typically formed of metal, but may be formed of any suitable material, such as a plastic material.

A laser diode light source assembly 16 is mounted at one end of housing 10 and secured thereto at flange 12. Typically the laser diode light source assembly 16 comprises a base element 18, which is attached to flange 12. A laser diode 20, typically an 1310 nm or 1550 nm laser diode, is mounted on base element 18 and arranged to direct a beam of laser radiation along an optical axis 22, which is preferably coaxial with the longitudinal axis of cylindrical housing 10.

The laser diode 20 typically receives electrical power and control inputs from an external driver (not shown). A lens 24 is preferably mounted on an internal mounting cylinder 26, fixed to base element 18 and is located within housing 10 for receiving the beam of laser radiation from laser diode 20 and directing it onto an radiation input location 28 in a modulator assembly 30.

Alternatively the internal mounting cylinder 26 may also be fixed to the housing 10 instead of being fixed to the base element 18.

It is a particular feature of the present invention that the optical connection between the laser diode 20 and the modulator assembly 30 is a fiberless connection. This feature greatly simplifies manufacture of the modulated light source and provides much more efficient coupling between the laser diode 20 and the modulator assembly 30 than was possible in the prior art which employs fiber connections.

The modulator assembly 30 is preferably a Mach-Zehnder type modulator, although any other suitable type of modulator can be employed. Modulator assembly 30 preferably comprises a substrate 32, preferably Gallium Arsenide (GaAs), onto which is formed, preferably by conventional semiconductor fabrication techniques, an input waveguide 34 which leads to a splitter 36.

A pair of generally parallel waveguides 38 and 40 extend from splitter 36 to a combiner 42 which terminates in an output waveguide 44. Radiation input location 28 is preferably at an end of input waveguide 34.

Output waveguide 44 preferably defines a radiation output location 48 which provides a modulated beam which can be coupled to an output fiber 50 by any suitable pigtailing technique. One such pigtailing technique employs the structure shown in FIG. 1A, namely a fiber mounting assembly 52 which includes a base element 54 onto which is mounted a fiber support 56. Base element 54 is preferably mounted onto flange 14 and also includes a lens 58, which is mounted via an internal mounting cylinder 60, fixed to base element 54. Lens 58 preferably directs light from radiation output location 48 onto an end of fiber 50 mounted on fiber support 56.

Alternatively the lens 58 does not have to be part of the fiber mounting assembly 52, rather the internal mounting cylinder 60 may be fixed directly to the housing 10 instead of being fixed to the base element 54.

It is appreciated that alternatively input and output waveguides 34 and 44 may be obviated. In such a case, light is directed directly to and from the splitter 36 and the combiner 42 respectively.

Modulator 30, which is typically a Mach-Zehnder modulator as shown in FIG. 1A, preferably includes multiple signal inputs 62 which supply suitable electrical signals from an external signal source (not shown) to waveguides 38 and 40 for varying the relative phase of the radiation passing therethrough, thereby to modulate the output intensity by radiation interference in the combiner 42 in a known manner.

Figure 1B:
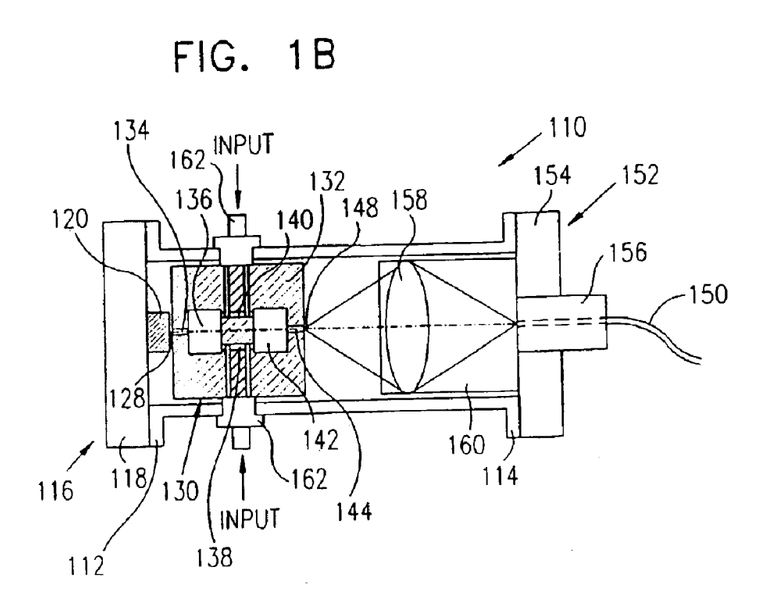
FIG. 1B is a simplified sectional illustration of a modulated light source module constructed and operative in accordance with another preferred embodiment of the present invention.

Reference is now made to FIG. 1B, which is a simplified sectional illustration of a modulated light source module constructed and operative in accordance with another preferred embodiment of the present invention.

The modulated light source of FIG. 1B preferably comprises a generally cylindrical housing 110, typically having a rectangular cross section and preferably having mounting surfaces, such as end flanges 112 and 114 at respective opposite ends thereof. Housing 110 is typically formed of metal, but may be formed of any suitable material, such as a plastic material.

A laser diode light source assembly 116 is mounted at one end of housing 110 and secured thereto at flange 112.

Typically the laser diode light source assembly 116 comprises a base element 118, which is attached to flange 112. A laser diode 120, typically an 1310 nm or 1550 nm laser diode, is mounted on base element 118 and arranged to direct a beam of laser radiation directly to a radiation input location 128 of a modulator 130 which is butted against laser diode 120.

The laser diode 120 typically receives electrical power and control inputs from an external driver (not shown).

As noted above, it is a particular feature of the present invention that the optical connection between the laser diode 120 and the modulator assembly 130 is a fiberless connection, such as in this example, a butted optical connection. This feature greatly simplifies manufacture of the modulated light source and provides much more efficient coupling between the laser diode 120 and the modulator assembly 130 than was possible in the prior art which employs fiber connections.

The modulator assembly 130 is preferably a Mach-Zehnder type modulator, although any other suitable type of modulator can be employed. Modulator assembly 130 preferably comprises a substrate 132, preferably Gallium Arsenide (GaAs), onto which is formed, preferably by conventional semiconductor fabrication techniques, an input waveguide 134 which leads to a splitter 136.

A pair of generally parallel waveguides 138 and 140 extend from splitter 136 to a combiner 142 which terminates in an output waveguide 144. Radiation input location 128 is preferably at an end of input waveguide 134.

Output waveguide 144 preferably defines a radiation output location 148 which provides a modulated beam which can be coupled to an output fiber 150 by any suitable pigtailing technique. One such pigtailing technique employs the structure shown in FIG. 1B, namely a fiber mounting assembly 152 which includes a base element 154 onto which is mounted a fiber support 156. Base element 154 is preferably mounted onto flange 114 and also includes a lens 158, which is mounted via an internal mounting cylinder 160, fixed to base element 154. Lens 158 preferably directs light from radiation output location 148 onto an end of fiber 150 mounted on fiber support 156.

It is appreciated that alternatively input and output waveguides 134 and 144 may be obviated. In such a case, light is directed directly to and from the splitter 136 and the combiner 142 respectively.

Modulator 130, which is typically a Mach-Zehnder modulator as shown in FIG. 1B, preferably includes multiple signal inputs 162 which supply suitable electrical signals from an external signal source (not shown) to waveguides 138 and 140 for varying the relative phase of the radiation passing therethrough, thereby to modulate the output intensity by radiation interference in the combiner 142 in a known manner.

Figure 2A:
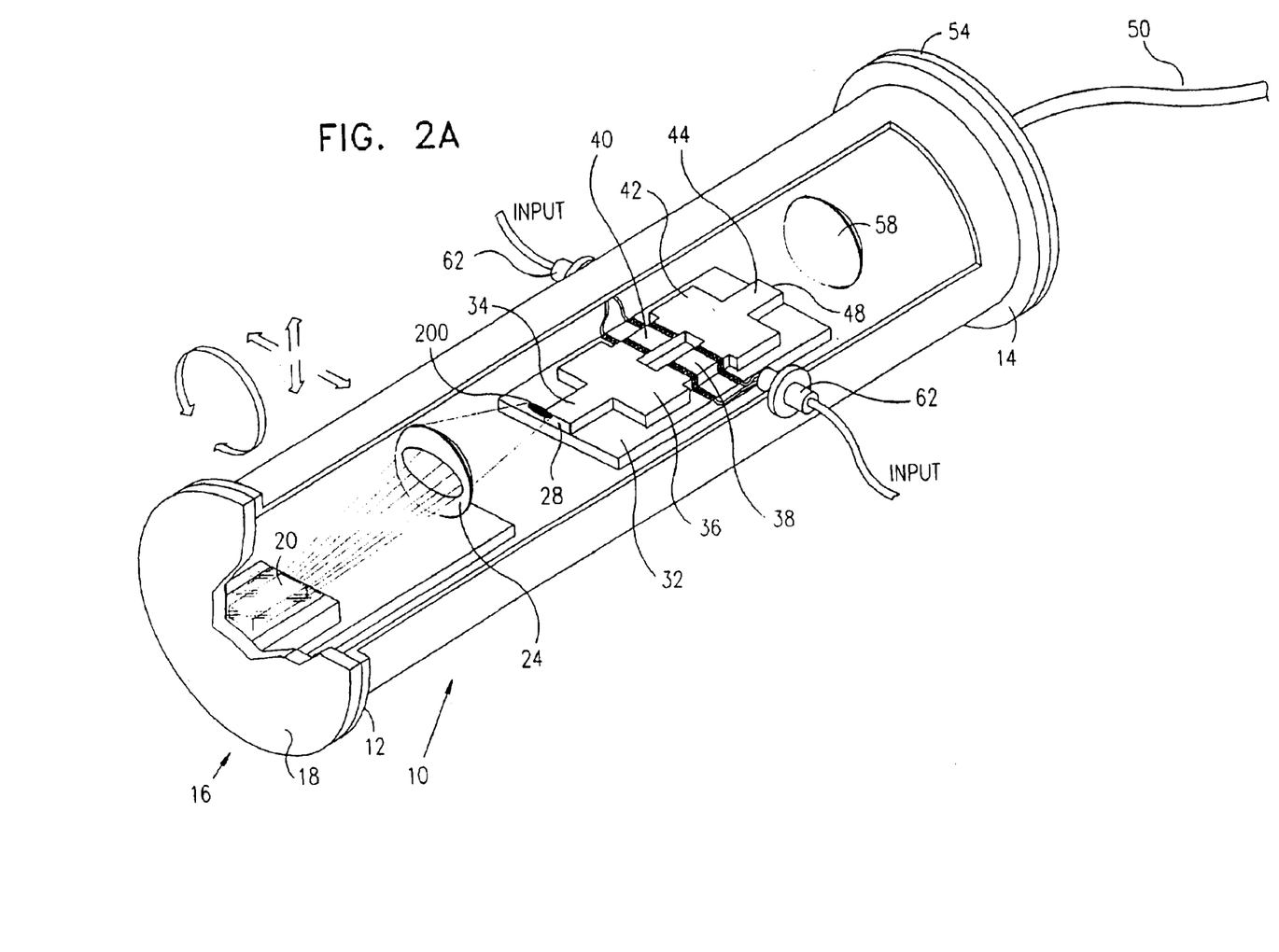
FIGS. 2A and 2B are simplified, partially cut-away pictorial illustrations of alignment and fixing of a Mach-Zender type modulator and a laser diode light source arranged in a housing in the manner shown in FIG. 1A in accordance with one embodiment of the present invention.
Figure 2B:
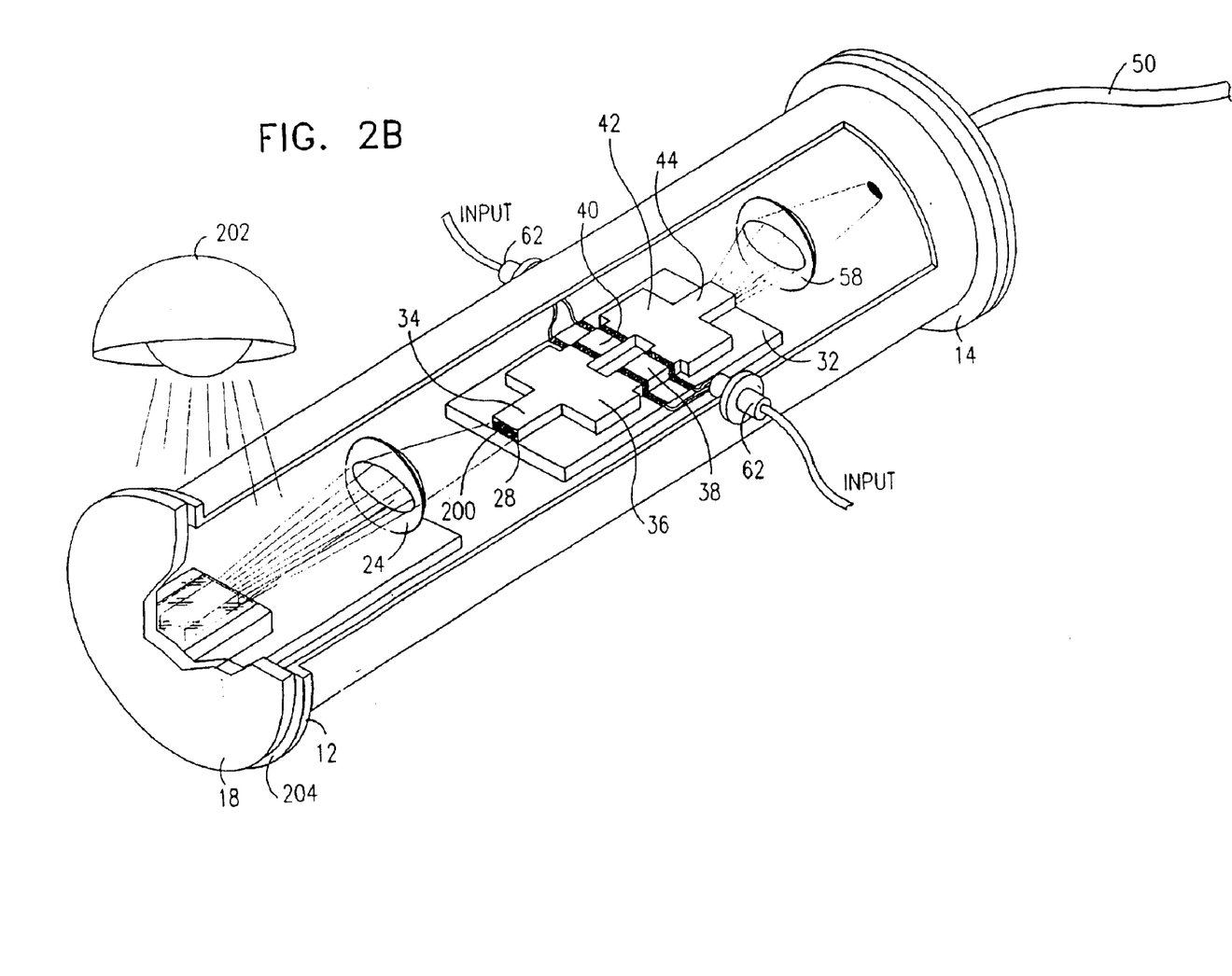

Reference is now made to FIGS. 2A and 2B, which are simplified, partially cut-away pictorial illustrations of alignment and fixing of a Mach-Zender type modulator and a laser diode light source in a housing in accordance with one embodiment of the present invention. For the sake of clarity and conciseness, all of the structural elements of the modulated light source appearing in FIGS. 2A and 2B are identified by the corresponding reference numerals used to designate them in FIG. 1A.

FIG. 2A shows that the laser diode light source assembly 16 has multiple degrees of freedom in positioning relative to flange 12. The relative positioning show in FIG. 2A is seen to be less than optimal, in that the radiation output of laser diode 20 is being focussed by lens 24 onto a location 200 which is offset from the radiation input location 28 defined on input waveguide 34. FIG. 2B illustrates that by suitable repositioning of base element 18 of assembly 16 relative to flange 12, location 200 is caused to be at the radiation input location 28, as desired and a desired rotational orientation of the laser diode is provided so that a desired orientation of the polarization of the beam is realized.

When the relative positions of the laser diode light source assembly 16 and flange 12 are as shown in FIG. 2B, the base element 18 is preferably bonded onto flange 12, preferably using a thin layer of UV curable adhesive 204 which does not involve significant shrinkage during curing, as by use of a UV light source 202, so that the relative position shown in FIG. 2B is preserved. Alternatively, any other suitable fixing technique or technology may be employed, such as, for example, laser welding or soldering.

Figure 3A:
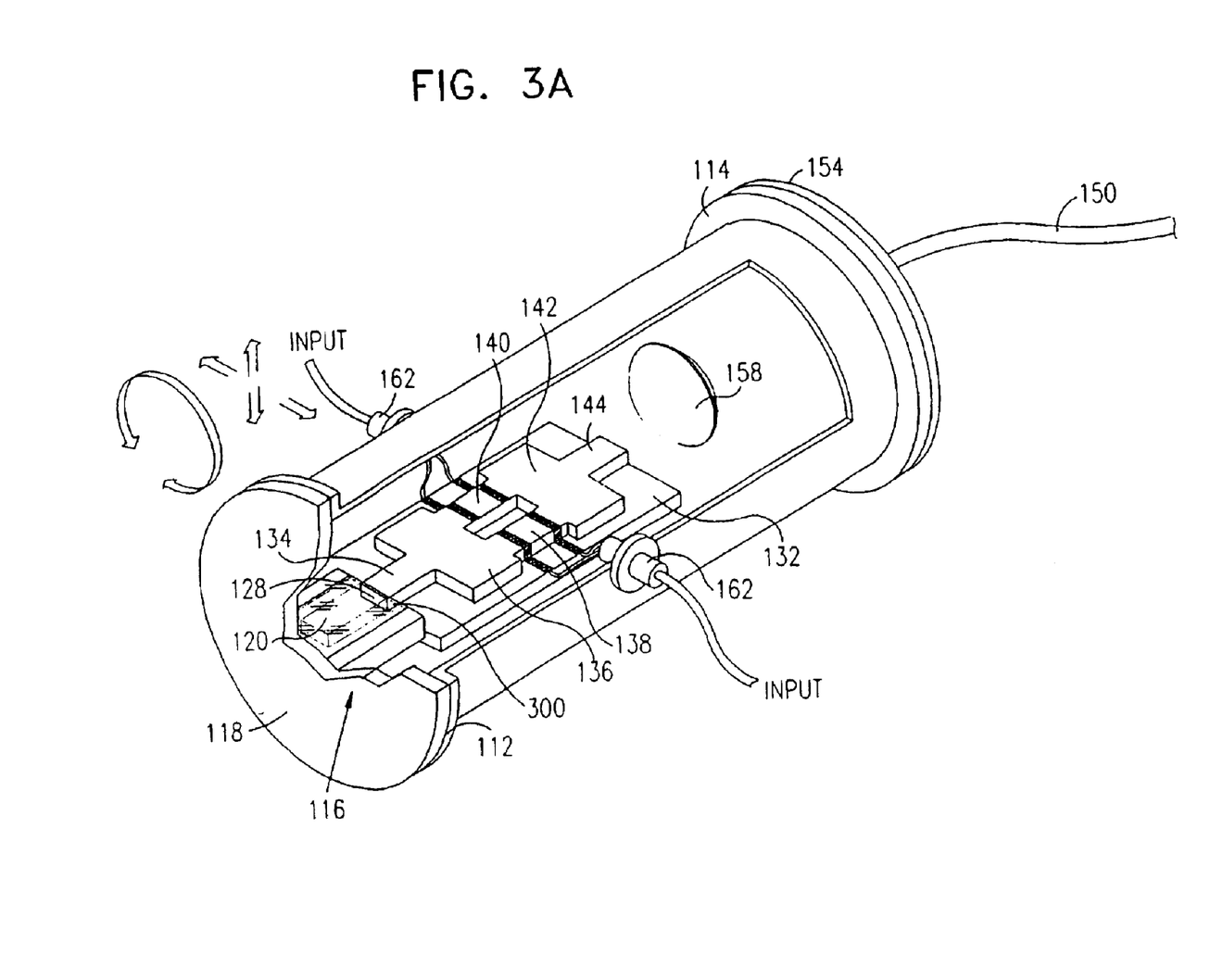
FIGS. 3A and 3B are simplified, partially cut-away pictorial illustrations of alignment and fixing of a Mach-Zender type modulator and a laser diode light source arranged in a housing in the manner shown in FIG. 1B in accordance with one embodiment of the present invention.
Figure 3B:
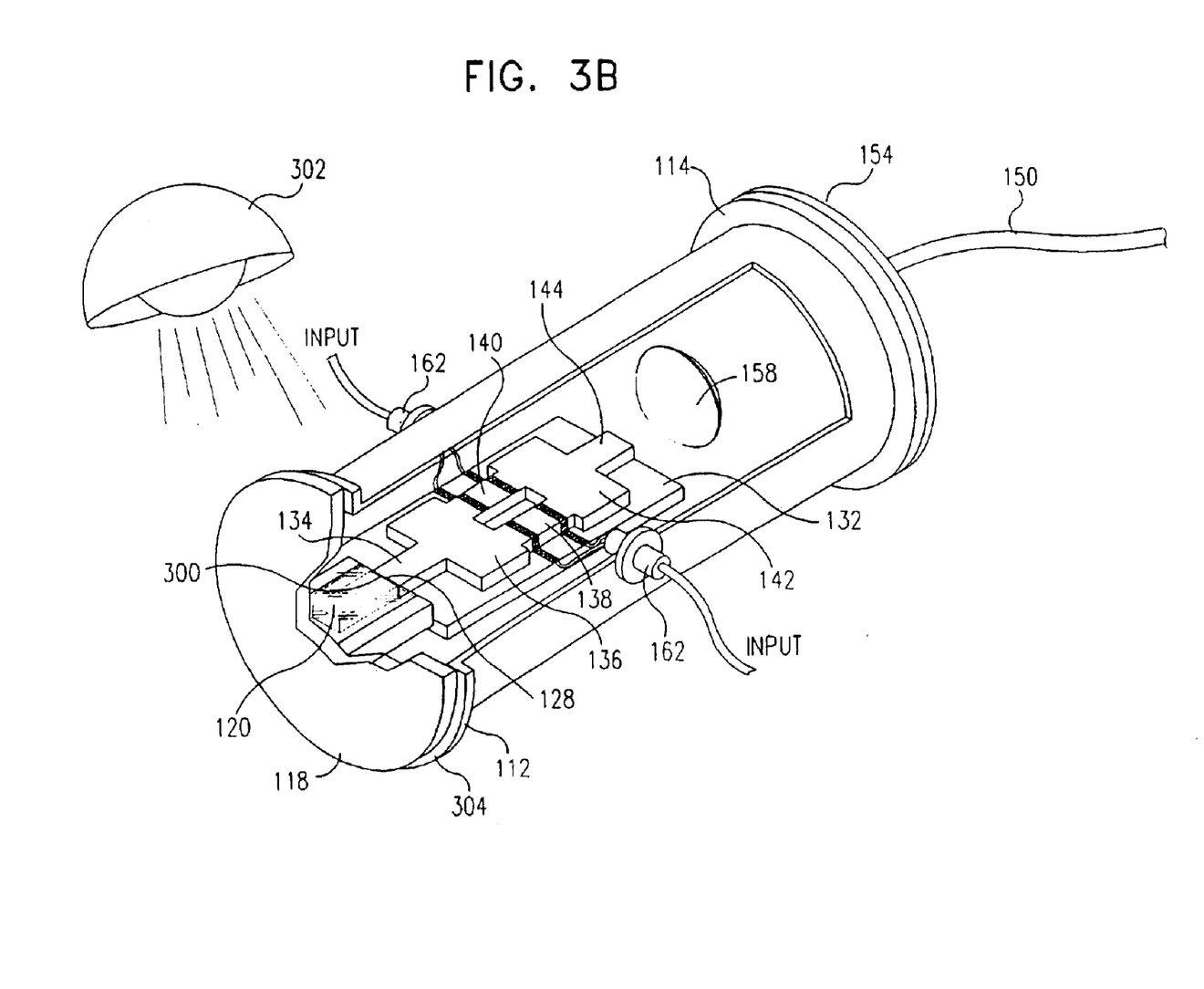

Reference is now made to FIGS. 3A and 3B, which are simplified, partially cut-away pictorial illustrations of alignment and fixing of a Mach-Zender type modulator and a laser diode light source in a housing in accordance with another embodiment of the present invention. It is noted that the methodology of FIGS. 3A and 3B is generally identical to that of FIGS. 2A and 2B, notwithstanding that FIGS. 2A and 2B relate to the structure of FIG. 1A while FIGS. 3A and 3B relate to the structure of FIG. 1B.

For the sake of clarity and conciseness, all of the structural elements of the modulated light source appearing in FIGS. 3A and 3B are identified by the corresponding reference numerals used to designate them in FIG. 1B.

FIG. 3A shows that the laser diode light source assembly 116 has multiple degrees of freedom in positioning relative to flange 112. The relative positioning show in FIG. 3A is seen to be less than optimal, in that the radiation output of laser diode 120 is located at a location 300 which is offset from the radiation input location 128 defined on input waveguide 134. FIG. 3B illustrates that by suitable repositioning of base element 118 of assembly 116 relative to flange 112, location 300 is caused to be at the radiation input location 128, as desired and a desired rotational orientation of the laser diode is provided so that a desired orientation of the polarization of the laser diode radiation is realized.

When the relative positions of the laser diode light source assembly 116 and flange 112 are as shown in FIG. 3B, the base element 118 is preferably bonded onto flange 112, preferably using a thin layer of UV curable adhesive 304 which does not involve significant shrinkage during curing, as by use of a UV light source 302, so that the relative position shown in FIG. 3B is preserved. Alternatively, any other suitable fixing technique or technology may be employed, such as, for example, laser welding or soldering.

Reference is now made to FIGS. 4A, 4B, 4C, 4D & 4E, which are simplified illustrations of various steps in the alignment and fixing of a Mach-Zender type modulator and a laser diode light source in a housing in accordance with another embodiment of the present invention.

In the embodiment of FIGS. 4A–4E, there is shown a preferred technique for precise alignment and assembly of a modulated light source including a modulator assembly 430, which preferably comprises a substrate 432, preferably Gallium Arsenide (GaAs), onto which is formed, preferably by conventional semiconductor fabrication techniques, an input waveguide 434 which leads to a splitter 436.

Figure 4A:
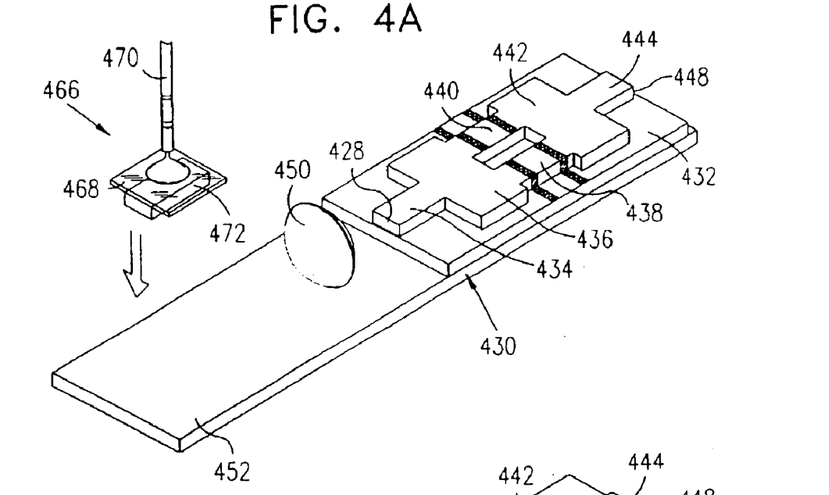
FIGS. 4A, 4B, 4C, 4D & 4E are simplified pictorial illustrations of various steps in the alignment and fixing of a Mach-Zender type modulator and a laser diode light source arranged in a housing in accordance with another embodiment of the present invention.

As seen in FIG. 4A, a pair of generally parallel waveguides 438 and 440 extend from splitter 436 to a combiner 442 which terminates in an output waveguide 444.

Radiation input location 428 is preferably at an end of input waveguide 434.

Output waveguide 444 preferably defines a radiation output location 448 which provides a modulated beam which can be coupled to an output fiber (not shown) by any suitable pigtailing technique. One such pigtailing technique employs the structure shown in FIG. 1A, namely a fiber mounting assembly 52 which includes a base element 54 onto which is mounted a fiber support 56. It is appreciated that, alternatively, input and output waveguides 434 and 444 may be obviated. In such a case, light is directed directly to and from the splitter 436 and the combiner 442 respectively.

Modulator 430, which is typically a Mach-Zehnder modulator as shown in FIG. 1A, preferably is provided with multiple signal inputs (not shown) supply suitable electrical signals from an external signal source (not shown) to waveguides 438 and 440 for varying the relative phase of the radiation passing therethrough, thereby to modulate the output intensity by radiation interference in the combiner 442 in a known manner.

An input lens 450 is preferably precisely mounted onto a substrate 452, typically formed of glass, ceramic or any other suitable material, and which also supports substrate 432.

As seen in FIG. 4A, a laser diode light source assembly 466, typically comprises a base element 468, which is supported during assembly as by a vacuum holder 470 for selectable positioning with multiple degrees of freedom relative to substrate 452. A laser diode 472, typically an 1310 nm or 1550 nm laser diode, is fixedly mounted to base element 468.

Figure 4B:
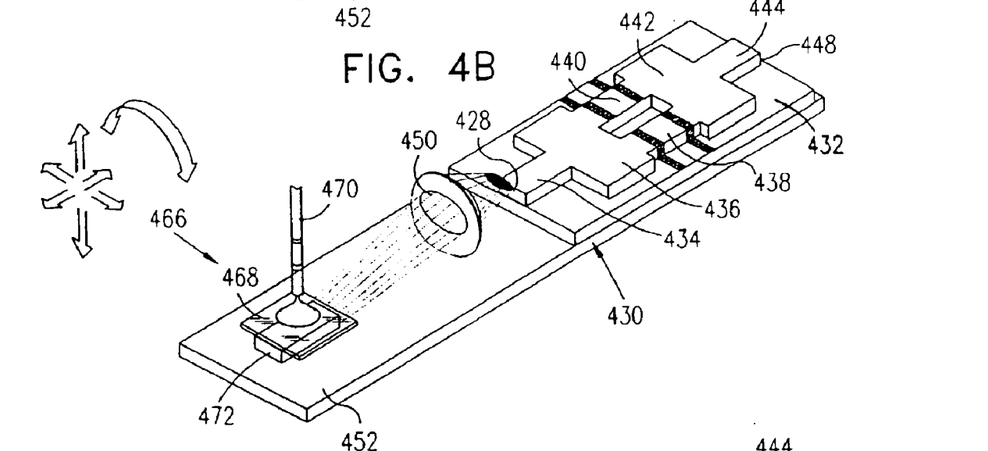

As seen in FIG. 4B, the laser diode light source assembly 466 is precisely positioned so as to direct a beam of laser radiation via lens 450 onto radiation input location 428 of modulator 430 and such that a desired rotational orientation of the laser diode is provided so that a desired orientation of the polarization of the beam is realized. The laser diode 472 typically receives electrical power and control inputs from an external driver (not shown).

As noted above, it is a particular feature of the present invention that the optical connection between the laser diode 472 and the modulator assembly 430 is a fiberless connection. This feature greatly simplifies manufacture of the modulated light source and provides much more efficient coupling between the laser diode 472 and the modulator assembly 430 than was possible in the prior art which employs fiber connections.

Figure 4C:
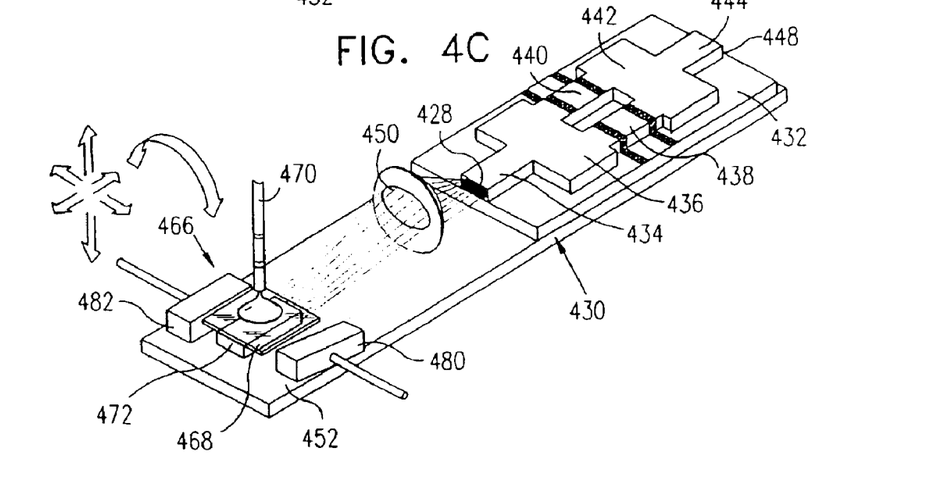
Figure 4D:
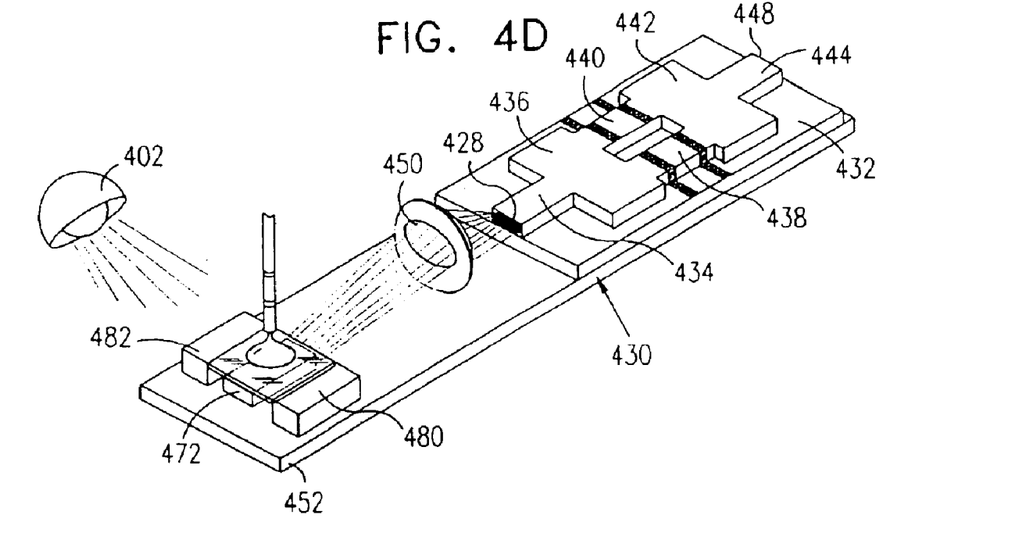

Once desired positioning of the laser diode light source assembly 466 has been achieved, side mounting blocks 480 and 482 are carefully positioned alongside base element 468 (FIG. 4C) and are bonded thereto and to substrate 452, preferably using a thin layer of UV curable adhesive (not shown) which does not involve significant shrinkage during curing, as by use of a UV light source 402, so that the relative position shown in FIG. 4C is preserved, as seen in FIG. 4D.

Figure 4E:
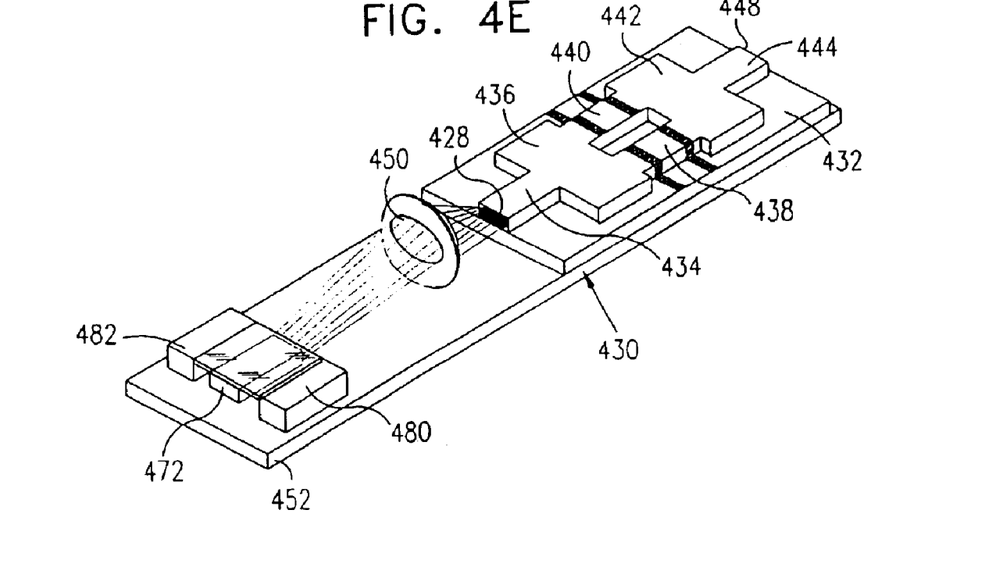

The finished, suitably aligned modulated light source is shown in FIG. 4E.

Reference is now made to FIGS. 5A, 5B, 5C, 5D & 5E, which are simplified illustrations of various steps in the alignment and fixing of a Mach-Zender type modulator and a laser diode light source in a housing in accordance with yet another embodiment of the present invention.

In the embodiment of FIGS. 5A–5E, there is shown a preferred technique for precise alignment and assembly of a modulated light source including a modulator assembly 530, which preferably comprises a substrate 532, preferably Gallium Arsenide (GaAs), onto which is formed, preferably by conventional semiconductor fabrication techniques, an input waveguide 534 which leads to a splitter 536.

Figure 5A:
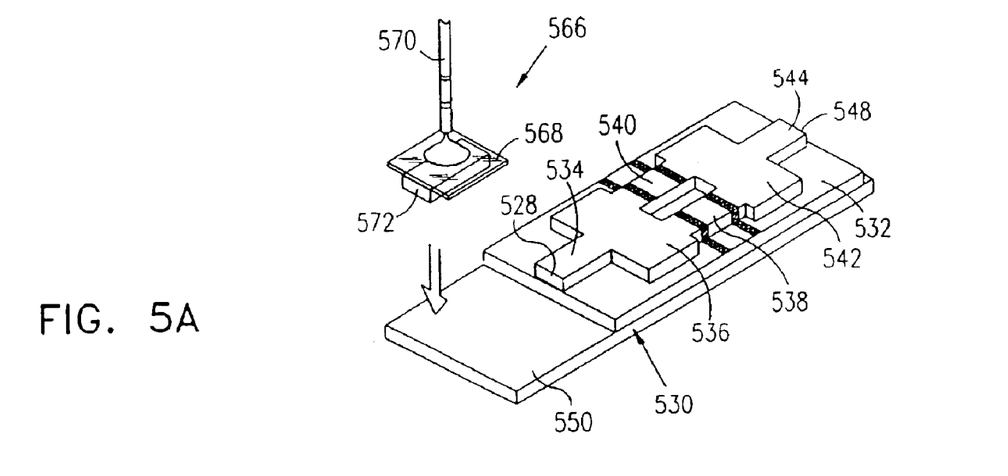
FIGS. 5A, 5B, 5C, 5D & 5E are simplified pictorial illustrations of various steps in the alignment and fixing of a Mach-Zender type modulator and a laser diode light source arranged in a housing in accordance with yet another embodiment of the present invention.

As seen in FIG. 5A, a pair of generally parallel waveguides 538 and 540 extend from splitter 536 to a combiner 542 which terminates in an output waveguide 544. Radiation input location 528 is preferably at an end of input waveguide 534.

Output waveguide 544 preferably defines a radiation output location 548 which provides a modulated beam which can be coupled to an output fiber (not shown) by any suitable pigtailing technique. One such pigtailing technique employs the structure shown in FIG. 1B, namely a fiber mounting assembly 152 which includes a base element 154 onto which is mounted a fiber support 156. It is appreciated that, alternatively, input and output waveguides 534 and 544 may be obviated. In such a case, light is directed directly to and from the splitter 536 and the combiner 542 respectively.

Modulator 530, which is typically a Mach-Zehnder modulator as shown in FIG. 1B, preferably is provided with multiple signal inputs (not shown) supply suitable electrical signals from an external signal source (not shown) to waveguides 538 and 540 for varying the relative phase of the radiation passing therethrough, thereby to modulate the output intensity by radiation interference in the combiner 542 in a known manner. A substrate 550, typically formed of glass, ceramic or any other suitable material supports substrate 532.

As seen in FIG. 5A, a laser diode light source assembly 566, typically comprises a base element 568, which is supported during assembly as by a vacuum holder 570 for selectable positioning with multiple degrees of freedom relative to substrate 532. A laser diode 572, typically an 1310 nm or 1550 nm laser diode, is fixedly mounted to base element 568.

Figure 5B:
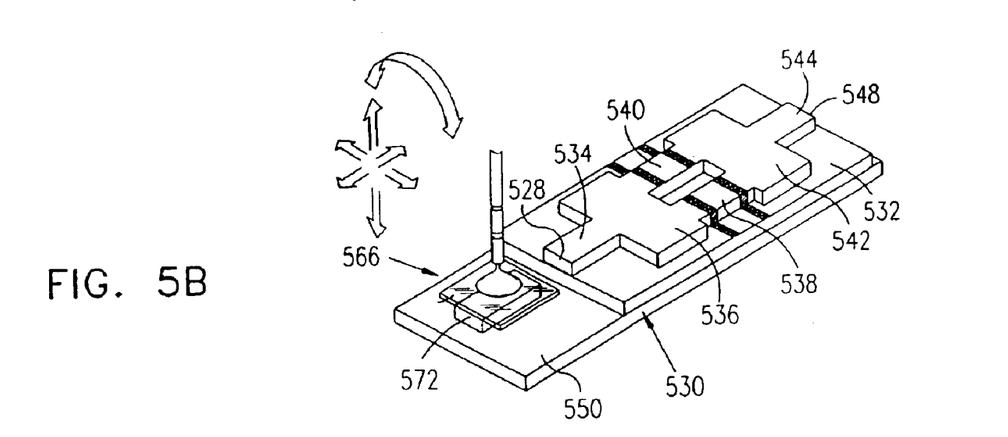
Figure 5C:
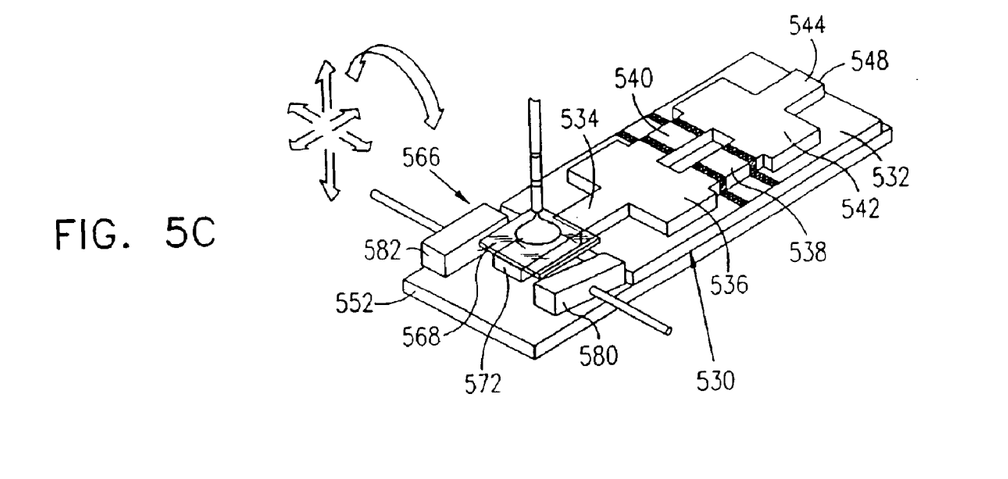

As seen in FIG. 5B, the laser diode light source assembly 566 is precisely positioned so as to direct a beam of laser radiation directly to a radiation input location 528 of modulator 530 which is butted against laser diode 570 and such that a desired rotational orientation of the laser diode is provided so that a desired orientation of the polarization of the laser diode radiation is realized. The laser diode 572 typically receives electrical power and control inputs from an external driver (not shown).

As noted above, it is a particular feature of the present invention that the optical connection between the laser diode 572 and the modulator assembly 530 is a fiberless connection. This feature greatly simplifies manufacture of the modulated light source and provides much more efficient coupling between the laser diode 572 and the modulator assembly 530 than was possible in the prior art which employs fiber connections.

Figure 5D:
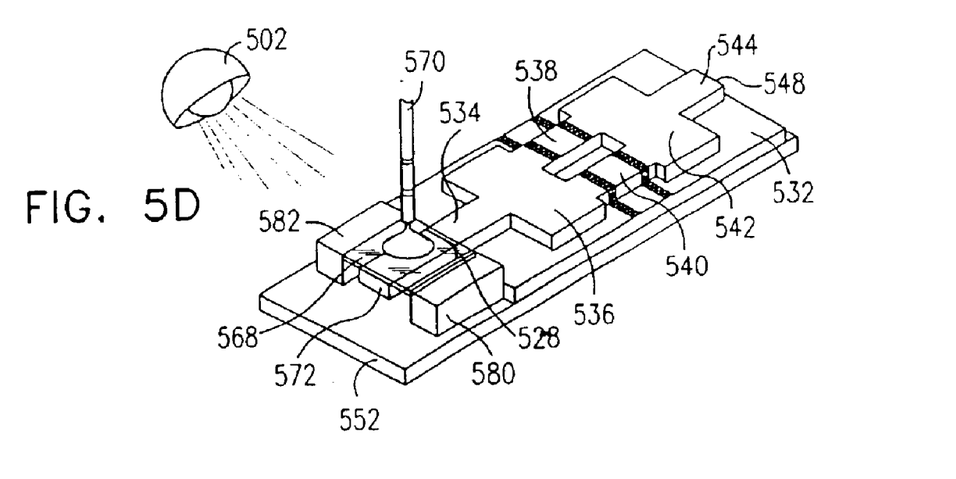

Once desired positioning of the laser diode light source assembly 566 has been achieved, side mounting blocks 580 and 582 are carefully positioned alongside base element 568 and are bonded thereto and to substrate 552 (FIG. 5C), preferably using a thin layer of UV curable adhesive (not shown) which does not involve significant shrinkage during curing, as by use of a UV light source 502, so that the relative position shown in FIG. 5B is preserved, as seen in FIG. 5D.

Figure 5E:
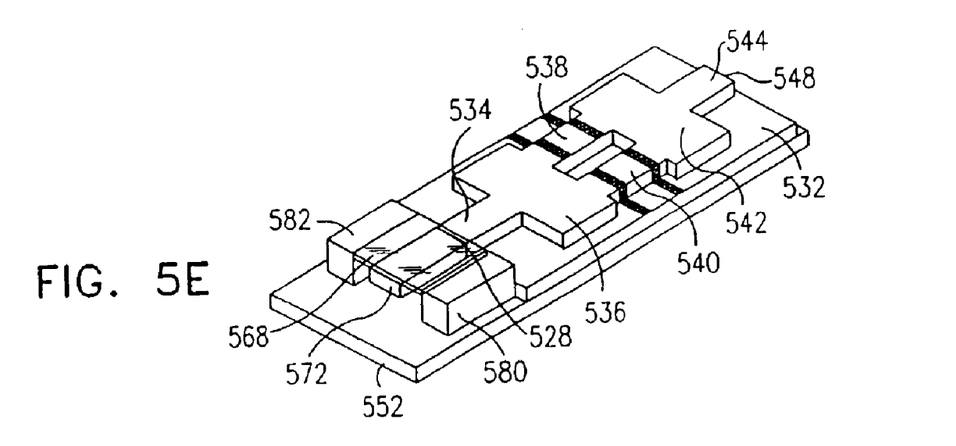

The finished, suitably aligned modulated light source is shown in FIG. 5E.

It will be appreciated by persons skilled in the art that the present invention is not limited by what has been particularly shown and described hereinabove. The present invention also includes combinations and subcombinations of the various features described hereinabove as well as modifications and variations thereof as would occur to a person of ordinary skill in the art upon reading the foregoing description and which are not in the prior art.

What is claimed is:

1. A method of producing a light source comprising:

providing a first waveguide device, implemented in gallium arsenide;

fiberlessly coupling light from a second waveguide device to said first waveguide device, said second waveguide device being a discrete element which is mechanically mounted in a desired position with respect to said first waveguide device;

enclosing said first waveguide device and said second waveguide device within a housing together with output optics operative to direct light from said first waveguide device into an optical fiber extending outwardly from said housing; and mounting said second waveguide device and said first waveguide device on parallel surface mountings, said parallel surface mountings including mutually facing surfaces which lie in parallel planes which are perpendicular to an optical axis of a light beam propagating from said second waveguide device towards said first waveguide device, said fiberlessly coupling comprising:

using at least one external manipulator, manipulating at least one of said first waveguide device and said second waveguide device relative to the other such that the output light beam of said second waveguide device enters said first waveguide device with relatively low light loss;

fixing said first waveguide device and said second waveguide device in desired relative positions independently of the external manipulator; and disengaging said at least one external manipulator from said light source.

2. A light source production method according to claim 1 and comprising:

butting said second waveguide device against an input to said first waveguide device.

3. A light source production method according to claim 1 and comprising:

coupling light from said second waveguide device to an input to said first waveguide device via a discrete lens.

4. A light source production method according to claim 1 and comprising:

aligning said second waveguide device and said first waveguide device by relative movement thereof in said parallel planes; and fixing said mutually facing surfaces together in desired alignment.

5. A method of producing a light source comprising:

providing a first waveguide device, implemented in gallium arsenide;

fiberlessly coupling light from a second waveguide device to said first waveguide device, said second waveguide device being a discrete element which is mechanically mounted in a desired position with respect to said first waveguide device;

enclosing said first waveguide device and said second waveguide device within a housing together with output optics operative to direct light from said first waveguide device into an optical fiber extending outwardly from said housing; and interconnecting an input multi-mode interference coupler and an output multi-mode interference coupler, using first and second waveguides having associated therewith electrodes for the application of voltage thereacross, thereby to vary the phase of light passing therealong, said fiberlessly coupling comprising:

using at least one external manipulator, manipulating at least one of said first waveguide device and said second waveguide device relative to the other such that the output light beam of said second waveguide device enters said first waveguide device with relatively low light loss;

fixing said first waveguide device and said second waveguide device in desired relative positions independently of the external manipulator; and disengaging said at least one external manipulator from said light source.

6. A method of producing a light source comprising:

providing a first waveguide device, implemented in gallium arsenide;

fiberlessly coupling light from a second waveguide device to said first waveguide device, said second waveguide device being a discrete element which is mechanically mounted in a desired position with respect to said first waveguide device;

enclosing said first waveguide device and said second waveguide device within a housing together with output optics operative to direct light from said first waveguide device into an optical fiber extending outwardly from said housing; and interconnecting an input Y-junction splitter and an output Y-junction combiner using first and second waveguides having associated therewith electrodes for the application of voltage thereacross, thereby to vary the phase of light passing therealong, said fiberlessly coupling comprising:

using at least one external manipulator, manipulating at least one of said first waveguide device and said second waveguide device relative to the other such that the output light beam of said second waveguide device enters said first waveguide device with relatively low light loss;

fixing said first waveguide device and said second waveguide device in desired relative positions independently of the external manipulator; and disengaging said at least one external manipulator from said light source.

* * * * *